W. L. PAUL.
ENGINE GANG PLOW.
APPLICATION FILED DEC. 19, 1916.
1,315,149.
Patented Sept. 2, 1919.
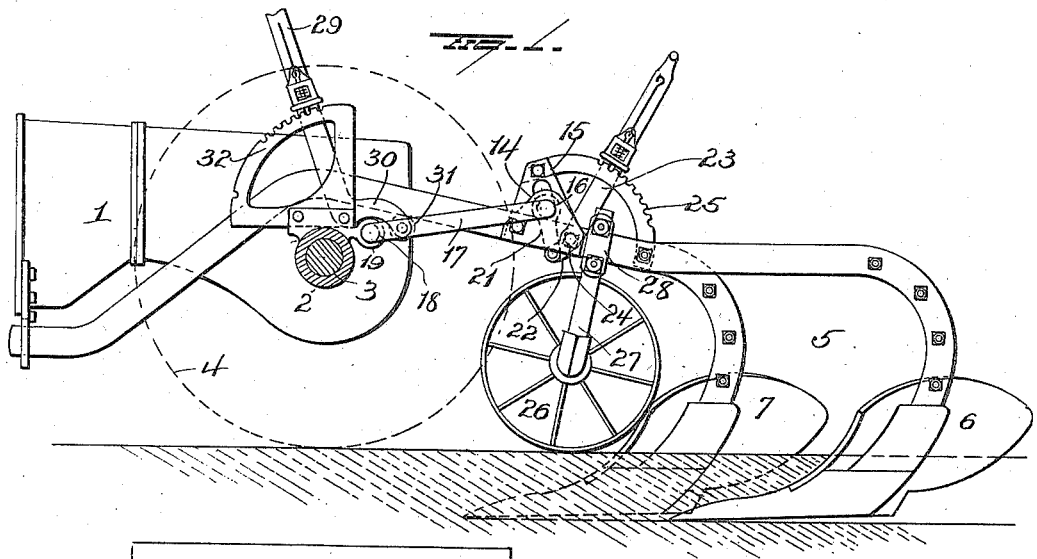
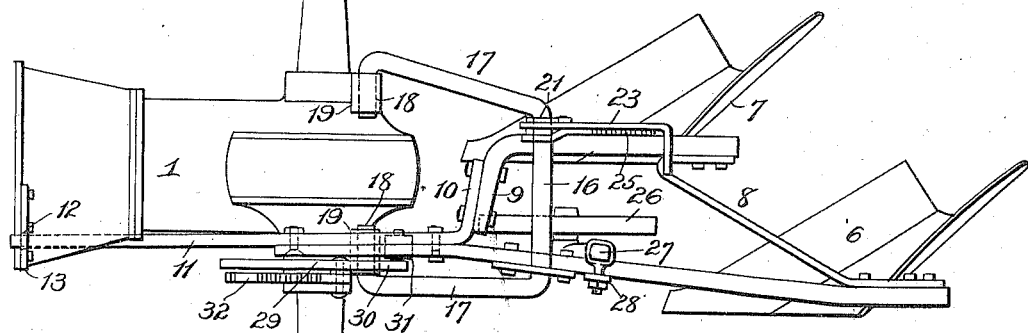
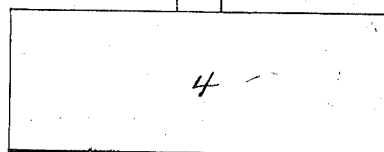

UNITED STATES PATENT OFFICE.

WILLIAM L. PAUL, OF SAN FRANCISCO, CALIFORNIA, ASSIGNOR TO OLIVER CHILLED PLOW WORKS, OF SOUTH BEND, INDIANA.

ENGINE GANG-PLOW.

1,315,149. Specification of Letters Patent. Patented Sept. 2, 1919.

Application filed December 19, 1916. Serial No. 137,820.

*To all whom it may concern:*

Be it known that I, WILLIAM L. PAUL, a citizen of the United States, and resident of San Francisco, in the county of San Francisco and State of California, have invented certain new and useful Improvements in Engine Gang-Plows; and I do hereby declare the following to be a full, clear, and exact description of the invention, such as will enable others skilled in the art to which it appertains to make and use the same.

This invention relates to improvements in plows and more particularly to such as employ a tractor as the draft means and known in the art as "engine gang plows."

One object of my present invention is to so construct an engine gang plow that the plow bases shall be caused to conform to the contour of the ground regardless of the hard and hilly or miry condition of the same and thus insure uniformity of depth of plowing under all and varying conditions of the ground being worked.

A further object is to provide an engine gang plow structure which shall embody a rigid beam extension connected with the forward portion of the tractor and so that the draft means for the gang may be connected with an intermediate portion of the latter and with the tractor in proximity to or in rear of the rear axle thereof.

A further object is to so connect a plow gang with a tractor, as to provide a "floating" plow connected close to the tractor and employing a gage wheel so located with respect to the plow bases that the latter will be caused to adapt themselves to the contour of the ground.

A further object is to provide simple and efficient means in an engine gang plow in which the wheels at one side of the tractor run in the furrow, to quickly adjust the gang to level the same relatively to the lateral inclination of the tractor and level said gang with respect to the ground.

A further object is to provide a draft device in an engine gang plow structure which shall have its rear portion which is connected with the plow, disposed at such angle with respect to the tractor as to maintain the plow level with the ground when the tractor is inclined laterally by reason of the running of the wheels at one side of the latter in the furrow.

A further object is to provide a draft device between the tractor and the plow gang, which shall be so corelated to these members of the structure that during forward working movement, the plow bases will be drawn downwardly and compelled to enter and remain in hard ground, and so that when the structure is backed, the plow bases will be caused to rise and thus ride out of the ground.

With these and other objects in view the invention consists in certain novel features of construction and combinations of parts as hereinafter set forth and pointed out in the claims.

In the accompanying drawings, Figure 1 is a side elevation of an engine gang plow structure embodying my improvements; Fig. 2 is a plan view, and Fig. 3 is a rear diagrammatic view.

1 represents a tractor (the forward end portion and front wheels of which are omitted) and 2 the mounting for the rear axle 3 with which the rear tractor wheels 4 are connected.

In the present instance I have shown a plow gang 5 comprising two plow units, 6, 7 (although a greater number of plow units may be employed, if desired), and the rear ends of these plow units may be rigidly connected by means of a brace 8. The beam of the plow unit 6 may extend forwardly over the rear axle of the tractor, while the beam of the plow unit 7 may be provided at its forward end with a lateral arm 9 projecting toward the beam of plow unit 6, and to said lateral beam arm, an arm 10 at the rear end of a beam-extension 11 is securely bolted. The beam 11 is also bolted to the beam of the plow unit 6 and extends downwardly and forwardly from the same. The beam 11 thus constitutes a beam extension for the gang and its forward end is made to project loosely through an opening 12 in a bracket 13 near the forward portion of the tractor and near one side thereof,—thus effecting a guiding and supporting connection for the plow gang to the tractor at a point well in advance of the rear axle of said tractor.

Brackets 14, 15 are secured to and project upwardly from the beams of the plow units 6—7 at points somewhat in rear of their connected forward ends, and these brackets are made with openings to accommodate the cross member 16 of a bail 17,—the side members of said bail being provided at their forward ends with pintles 18 pivotally mounted in bosses 19 on the rear axle mounting of the tractor. The opening in the bracket 15 through which the cross bar of the bail passes is made elongated and adjacent to this bracket, a link 21 is loosely connected with the cross bar 16 of the bail and depends therefrom. The lower arm 22 of a hand lever 23 is connected with the lower end of the link 21, said hand lever being pivoted at 24 to the plow unit 7 and is provided with a suitable detent to engage a toothed segment 25 secured at one end to the bracket 15 and at the other end to the plow unit 7.

It will be observed that with the construction above described, the plow gang is connected with the rear portion of the tractor through the medium of the bail 17; that the beam extension 11 of the gang is loosely connected with the forward portion of the tractor and is supported by the latter so that the gang bases may rise and fall to conform to the contour of the ground, the forward connection of the beam extension to the tractor constituting a fulcrum for the plow gang.

In order that the conformity of the bases of the plow units to the contour of the ground shall be accurate and uniform depth of plowing be thus insured, I provide a gage wheel 26 located approximately between the points of the two plow bases. The standard 27 of this gage wheel will be adjustably connected with the beam of the plow unit 6 by means of a suitable clamp, such for instance, as illustrated at 28.

In engine gang plow structures in which the plow gang is connected comparatively close to the rear of the tractor, the wheels at one side of the latter may run in the furrow and hence the rear axle would be inclined laterally. It is important however, that the plow gang shall be so disposed that it shall be level with the land, and for this reason, the bail 17 is so formed that one end of its cross bar 16 shall be higher than the other end, as shown in Fig. 3, thus causing said cross bar to assume a position at an angle to the plane of the rear axle of the tractor. With such arrangement, it is evident that when the plow structure is at work with the wheels at one side of the tractor running in the furrow, the cross bar 16 of the bail will maintain an approximately horizontal position and the plow units will be kept in position to run at uniform depths. It is desirable however to be able to accurately level the plow units so that they shall be caused to run at uniform depths under all conditions, as when the plowing is first begun or when the plows are adjusted to change the depth of plowing. This can be readily accomplished by manipulation of the hand lever 23, as will be readily understood.

The bail 17, by its connection across the beams of the plow units, serves to steady the plow gang and to resist torsional strains, and it also serves as a draft device for the plow gang, while the forward end of the beam extension of the plow gang is pivotally and slidingly supported and connected with the forward portion of the tractor.

It will be observed that the plow gang will, during operation, have a "floating" characteristic, which will insure accurate and uniform plowing.

To provide means for raising the plow gang, I may employ a manually operable lever. In the present instance, a hand lever 29 is pivotally mounted on the rear axle mounting 2 of the tractor and provided with a rearwardly projecting arm 30 having a roller 31 mounted at its rear end, said roller being disposed to engage the under side of the beam of the connected plow units only when operated to raise the gang. A toothed segment 32 is secured to the axle mounting 2 and the lever 29 is provided with a suitable detent to engage said segment.

By reference to Fig. 1 of the drawing, it will be observed that the connection of the rear end of the bail 17 with the plow gang is in a higher plane than is the pivotal connection of the forward end of the bail with the tractor, and hence said bail inclines forwardly and downwardly from its connection with the plow gang. This is important because it causes the plow bases to be forced into the ground and kept properly in hard ground as the plow structure moves forwardly, and on the other hand it causes the plow bases to run out of the ground when the tractor is backed and thus facilitates overcoming impassable obstructions in the field.

Various changes might be made in the details of construction of my invention without departing from the spirit of my invention or limiting its scope and hence I do not wish to restrict myself to the precise details herein set forth.

Having fully described my invention what I claim as new and desire to secure by Letters-Patent, is:—

1. The combination of a draft wheeled frame, and a plow having a beam extension extending over and beyond the rear axle of the wheeled draft frame and loosely supported by the latter forwardly of said rear axle, and a draft member having draft connection with the rear portion of the wheeled draft frame and with the beam of the plow in rear of the beam extension thereof and in rear of the wheeled draft frame.

2. The combination with a wheeled draft frame, of a plow having a forward beam extension supported at its forward portion by said wheeled draft frame forwardly of the rear axle thereof, and a bail pivoted to the rear portion of the wheeled draft frame and connected with the plow rearwardly of said beam extension, the cross member of the bail having one end higher than the other whereby said cross bar may be horizontal when the wheeled draft frame is transversely inclined.

3. The combination with a wheeled frame, and a "floating" plow gang having a beam extension freely supported by the wheeled frame in advance of the rear axle thereof, of a draft bail pivotally connected with the wheeled frame in proximity to the rear axle and connected with the respective beams of the plow gang intermediate the ends thereof, and a gage wheel connected with the plow gang so as to be disposed approximately between the points of the bases of the units of the gang.

4. The combination with a wheeled frame, and a plow gang having a beam extension freely supported and guided by the wheeled frame in advance of the rear axle thereof, of a draft bail connecting the rear portion of the wheeled frame with the plow gang rearwardly of the wheeled frame, said bail being connected with the respective units rearwardly of the beam extension of the plow gang and inclining therefrom downwardly and forwardly from such connection, when the plow is in working position, to the wheeled frame, and a gage wheel connected with the plow gang rearwardly of the connection of the bail with the wheeled frame.

5. The combination with a wheeled frame, a plow gang having a forward beam extension, and means affording a loose, guiding and free supporting connection between the beam extension and the wheeled frame forwardly of the rear axle of the latter, of a draft bail pivotally connected with the rear portion of the wheeled frame and with the plow gang behind the wheeled frame and rearwardly of the beam extension.

6. The combination with a wheeled frame, a plow having a forward beam extension, and means affording a loose, guiding and free supporting connection between the forward end portion of the beam extension and the wheeled frame forwardly of the rear axle thereof, of a draft bail pivotally connected with the rear portion of the wheeled frame and with the plow gang behind the wheeled frame in rear of said beam extension, and a gage wheel connected with the plow gang rearwardly of the connection of the draft bail thereto.

7. The combination with a wheeled frame, and a plow gang having a beam extension freely supported by the wheeled frame forwardly of the rear axle thereof, of a bail pivotally connected at its forward end with the rear portion of the wheeled frame and at its rear end to an intermediate portion of the plow gang, a link depending from the bail, a lever pivoted to the plow gang and connected with the depending link, and means for locking said lever.

8. The combination with a wheeled frame, and a plow gang having a forward beam extension freely supported by the wheeled frame forwardly of the rear axle of the latter, of a draft bail pivoted to the rear portion of the wheeled frame and to the plow gang behind the wheeled frame and in rear of said beam extension, a lever mounted on the wheeled frame and having a rearwardly projecting arm carrying a roller disposed under the beam of the plow gang for raising the latter, and means for locking said lever.

In testimony whereof, I have signed this specification in the presence of two subscribing witnesses.

WILLIAM L. PAUL.

Witnesses:
 EDWIN NICAR,
 CHARLES A. WEBSTER.